United States Patent [19]
Suematsu et al.

[11] Patent Number: 5,537,159
[45] Date of Patent: Jul. 16, 1996

[54] INTERPOLATION METHOD AND APPARATUS FOR IMPROVING REGISTRATION ADJUSTMENT IN A PROJECTION TELEVISION

[75] Inventors: Masayuki Suematsu, Chiba; Toshihiko Hamamatsu, Saitama; Makoto Kondo, Kanagawa, all of Japan

[73] Assignee: Sony Corporation, Tokyo, Japan

[21] Appl. No.: 246,131

[22] Filed: May 19, 1994

[30] Foreign Application Priority Data

May 27, 1993 [JP] Japan .................................. 5-148520
Jul. 7, 1993 [JP] Japan .................................. 5-191852

[51] Int. Cl.⁶ .............................. H04N 9/28; H04N 9/31
[52] U.S. Cl. .................. 348/745; 348/806; 348/189; 348/572; 315/368.13
[58] Field of Search .................................. 348/730, 731, 348/734, 86, 87, 180, 189, 190, 572, 571, 678, 686, 687, 744, 747, 745, 806; 315/368.13, 370; H04N 9/31, 9/28

[56] References Cited

U.S. PATENT DOCUMENTS

| | | | |
|---|---|---|---|
| 4,673,847 | 6/1987 | Louie et al. ....................... | 315/368.13 |
| 5,298,985 | 3/1994 | Tsujihara et al. ................... | 348/745 |
| 5,345,280 | 9/1994 | Kimura et al. ..................... | 315/368.13 |
| 5,382,984 | 1/1995 | Tsujihara et al. ................... | 348/746 |

*Primary Examiner*—Safet Metjahic
*Assistant Examiner*—Glenton B. Burgess
*Attorney, Agent, or Firm*—Jay H. Maioli

[57] ABSTRACT

The nonlinear, deflection waveform used improve registration in a three picture tube projection television system is produced using interpolation of stored data setting points by first performing a reduced number of high-order interpolation calculations using the setting points and then performing low-order interpolation calculations either between two calculated high-order interpolated data points or between one of the calculated high-order interpolated data points and one of the setting points. This results in reducing the work load on the central processing unit in the registration system. In addition, a reduced bit-size requirement for the interpolation portion of the registration is obtained by storing registration data of a first bit size and then adding bits below the original LSB for the interpolation calculation prior to performing the digital to analog conversion.

6 Claims, 14 Drawing Sheets

INTERPOLATION METHOD AND APPARATUS FOR IMPROVING REGISTRATION ADJUSTMENT IN A PROJECTION TELEVISION

BACKGROUND OF THE INVENTION

1. Field of the Invention

The present invention generally relates to a method and apparatus for performing a registration adjustment for correcting picture distortion and color shifts occurring in a projection television and, more particularly, to an interpolation method for improving the registration adjustment process.

2. Description of the Background

Recently, various types of projection television sets for displaying a picture on a large size screen with high precision have been practically utilized.

FIGS. 5A and 5B schematically show a structure of this sort of projection television 1, in which SC indicates a screen on which a picture or image is projected. Individual light projecting units that project each of a red component (R), a green component (G), and a blue component (B) of the primary color picture are provided on the rear side of this screen SC, which constitutes a so-called rear projection television combined with a screen.

The light projecting unit includes cathode ray tubes (CRTs) for producing the respective primary picture light, deflection yokes DY for deflecting electron beams of these CRTs, and focusing lenses CD for focusing the primary color picture light formed by the CRTs onto the screen SC. The respective primary color picture light irradiated from the light projecting unit is projected via a rear-mounted reflection mirror to the screen SC. The screen can be a lenticular screen constructed as a Fresnel lens, for example. It should be noted that when the reflection mirror M is not employed, such as in the structure shown in FIG. 6, the respective primary color picture light is directly projected from the rear side of the screen SC.

As is apparent from the structures shown in FIGS. 5A, 5B, 6, an optical system is so constructed in the rear projection television 1 with such a structure that the picture light is obliquely projected to the screen SC. In other words, since the optical system is asymmetrically arranged with respect to the screen in the rear projection television 1, the picture light projected from the CRTs must be previously distorted in such a manner that the distortion components caused by this asymmetrical arrangement are canceled in order to project proper pictures without distortion.

Distortion of the projected picture image for canceling asymmetry in the optical system will be referred to as registration correction. A circuit for performing this registration correction is employed in the rear projection television 1 having the above-described structure, and the structure of the rear projection television 1 will now be explained with reference to FIG. 7 in which a video signal processing circuit 2 separates a video signal inputted from a video signal input terminal Vin into R, G, B signals. Video output circuits 3-1, 3-2, 3-3 supply the red component (R), green component (G), blue component (B) of the respective primary color pictures to the red CRT, green CRT, and blue CRT, respectively.

A sync separating circuit 4 extracts a horizontal synchronization signal H and a vertical synchronization signal V from the video signal and outputs these sync signals. A horizontal oscillating circuit 5 produces a horizontal oscillating signal in response to the horizontal sync signal H from the sync separating circuit 4 and a vertical oscillating circuit 6 produces a vertical oscillating signal in response to the vertical sync signal V from the sync separating circuit 4. A horizontal deflection output circuit 7 produces a horizontal deflection signal in accordance with the horizontal oscillating signal and supplies the horizontal deflection signal to the horizontal deflection yoke of the respective CRTs. A vertical deflection output circuit 8 produces a vertical deflection signal in accordance with the vertical oscillating signal and supplies the vertical deflection signal to the vertical deflection yokes of the respective CRTs. A high-voltage output circuit 9 produces a high voltage based upon the horizontal oscillation signal and applies this high voltage to the anode electrodes of the respective CRTs.

A registration correction waveform generating circuit 10 generates a registration correction waveform in accordance with the horizontal deflection signal and the vertical deflection signal, by which asymmetry of the projection optical system is eliminated. This correction waveform corresponds to a signal waveform for defining picture or image distortion. A registration output circuit 11 supplies the correction waveform to a sub-deflection yoke DY1 of each of the three CRTs. The sub-deflection yoke DY1 distorts the picture light projected onto the screen SC in response to the correction waveform, so as to cancel the asymmetry of the optical system, thereby forming a proper image without any distortion on the screen SC.

Therefore, one approach to improving image registration in a projection television is to generate a correction waveform according to some non-linear function that can alter the deflection of the beam in the cathode ray tube, so that such altered beam when combined with the image distortion caused by the arrangement of the respective tubes relative to the screen will result in a corrected image. This approach is seen as an analog approach to providing image registration correction.

On the other hand, digital deflection control systems are known, such as those described in U.S. Pat. Nos. 4,672,275 or 4,754,204 or 5,138,442, for example. Thus, it is also possible to provide a digital correction signal for use in such a digital deflection system.

In both of these two approaches there is the problem of the overall size of the circuitry needed to calculate and interpolate the correction waveform, either analog or digital. On the one hand, when providing digital correction demands are placed on the central processing unit of the microcomputer and, on the other hand, the size and speed of the digital memory can become prohibitive.

Interpolation is one method to arrive at the correction waveform and it known that interpolation can become complicated and time consuming, especially higher order interpolation. Similarly, digital calculations of the correction waveform are limited in their accuracy by the bit size of the data word used in the calculations.

OBJECTS AND SUMMARY OF THE INVENTION

It is, therefore, an object of the present invention to provide a method and apparatus for registration correction in a projection television system that can overcome the drawbacks inherent in the prior art.

The present invention has been made in an attempt to solve the above-described drawbacks and has an object to provide a data interpolating method and a data interpolating apparatus with short processing time required to execute an interpolation calculation, and also to eliminate the requirement for a non-volatile memory having a large memory capacity.

As previously explained, since resolution of the adjustment points is equal to that of the interpolation data, when resolution of the interpolation points is, for instance, 12 bits the non-volatile memory requires a memory capacity corresponding to 12-bit resolution of the adjustment points. Also, the larger the capacity of the non-volatile memory, the higher the cost thereof. Accordingly, the cost of the entire system would also be increased.

To achieve the above-described object, a data interpolating method, according to an aspect of the present invention, comprises a high order interpolation step where a high order interpolating calculation is carried out relative to setting data allocated to each data point, and first interpolation data calculated by said interpolating calculation is interpolated among the respective data points; and a low order interpolation step where second interpolation data calculated by a low order interpolating calculation is interpolated either between said setting data and said first interpolation data, or between two pieces of said first interpolation data.

According to another aspect of the present invention a data interpolating apparatus comprises high order interpolating means for performing a high order interpolating calculation relative to setting data allocated to each data point and for interpolating first interpolation data calculated by said interpolating calculation among the respective data points; and low order interpolating means for interpolating second interpolation data calculated by a low order interpolating calculation between either said setting data and said first interpolation data, or two pieces of said first interpolation data.

A data interpolating apparatus according to another aspect of the present invention comprises high order interpolating means for performing a high order interpolating calculation relative to setting data allocated to each data point, and for interpolating first interpolation data calculated by said interpolating calculation among the respective data points; low order interpolating means for interpolating second interpolation data calculated by a low order interpolating calculation between either said setting data and said first interpolation data, or two pieces of said first interpolation data; and converting means for sequentially sampling the setting data corresponding to the respective data points, and said first and second interpolation data interpolated among said data points, and for converting the sampled data into a waveform signal.

As a preferable aspect, the high order interpolating means causes said setting data corresponding to the respective data points and said first interpolation data interpolated among said data points to be temporarily stored into storage means. The above-described high order interpolating means and the low order interpolating means include storage means, respectively, each of which temporarily stores the setting data corresponding to the respective data points, and said first and second interpolation data interpolated among said data points.

In regard to problems encountered in systems using digital deflection control systems, the present invention provides a system wherein a bit number of registration adjusting data for 3 primary color picture signals is "n", m-bit data is added to data smaller than LSB of said data having the bit number of "n", which will then be converted into (n+m)-bit data. An interpolation is carried out with the value of said (n+m)-bit data, thereby outputting (n+m)-bit interpolation data, and said interpolation data is converted via a D/A converter into an analog signal which will then constitute deflection correction data for each projection tube.

Also, a color image appliance is constructed of a registration correction waveform generating unit for employing such a registration interpolating method.

In the data interpolating method according to one aspect of the present invention, the high order interpolation calculation is performed relative to the setting data allocated to the respective data points at the high order interpolation step, and the first interpolation data calculated by this interpolating calculation is interpolated among the respective data points. At the low order interpolation step, the interpolation is calculated between either the setting data and the first interpolation data, or two pieces of the first interpolation data based on the second interpolation data calculated by the low order interpolating calculation.

As a consequence, the processing time required for the interpolating calculation is shortened and also a conventional non-volatile memory having such a large memory capacity is no longer required.

As the capacity of the memory for setting resolution of the sample point can be reduced, it is possible to realize the system with a low-cost memory.

Also, since resolution of the adjustment points become coarser than that of the prior art, the adjustment time can be shortened.

As previously described, in accordance with the present invention, the high order interpolation calculation is performed to the setting data allocated to the respective data points at the high order interpolation step, and the first interpolation data calculated by this interpolating calculation is interpolated among the respective data points. At the low order interpolation step, the interpolation is calculated between either the setting data and the first interpolation data, or two pieces of the first interpolation data based on the second interpolation data calculated by the low order interpolating calculation. As a consequence, the processing time required for the interpolating calculation is shortened and also such a conventional non-volatile memory having a large memory capacity is no longer required.

As previously described, in accordance with the color image apparatus and the registration interpolation method thereof of the present invention, the capacity of the non-volatile memory for setting the adjustment points can be reduced, and the system may be realized with employment of a low-cost non-volatile memory.

Furthermore, although resolution of the adjustment points becomes more or less rough, the interpolation errors may be set within the allowable range and the adjustment time required to input the setting data may be shortened.

The manner in the above and other objects, features, and advantages are accomplished by the present invention will become evident from the following detailed description that is to be read in conjunction with the appended drawings, in which like reference characters represent the same or similar elements.

DETAILED DESCRIPTION OF PREFERRED EMBODIMENTS

Figure 1:
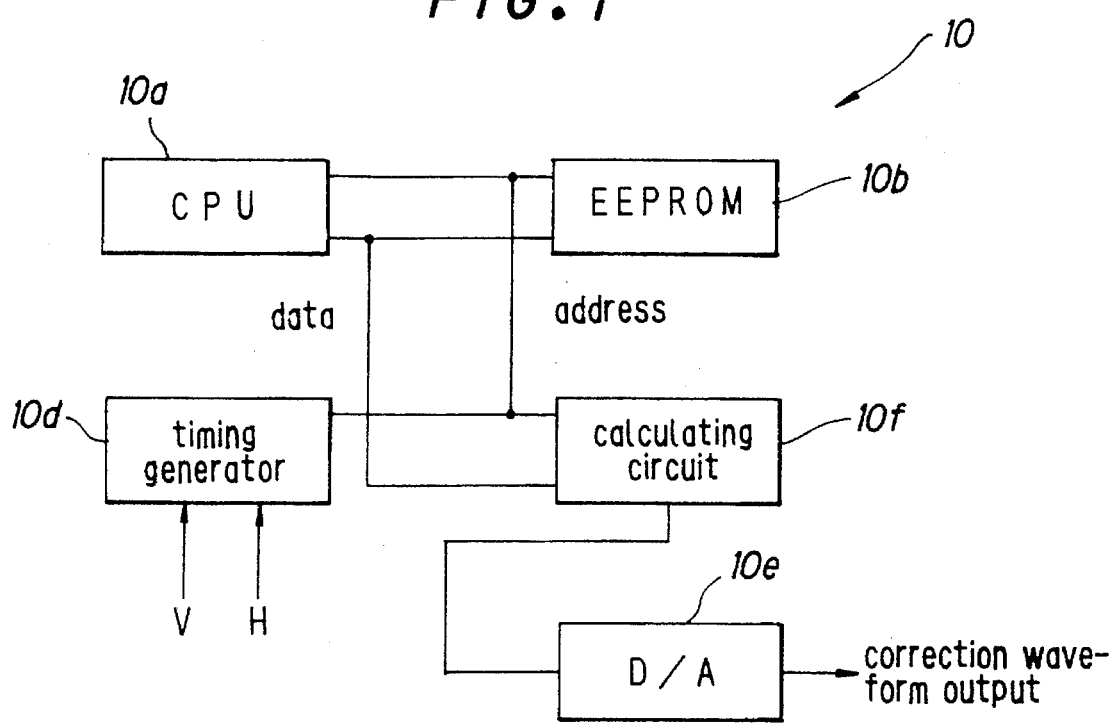
FIG. 1 is a block diagram of a data interpolating apparatus according to one embodiment of the present invention.
Figure 8:
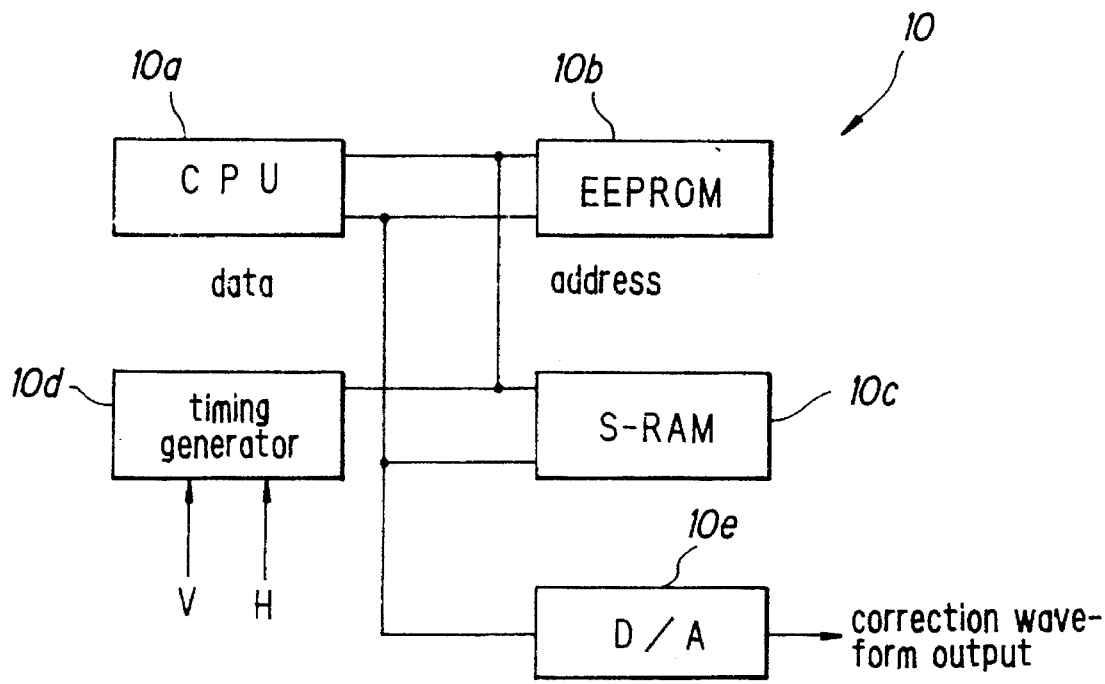
FIG. 8 is a block diagram of a first structure of a registration correction waveform generating circuit according to an embodiment of the present invention.
Figure 10:
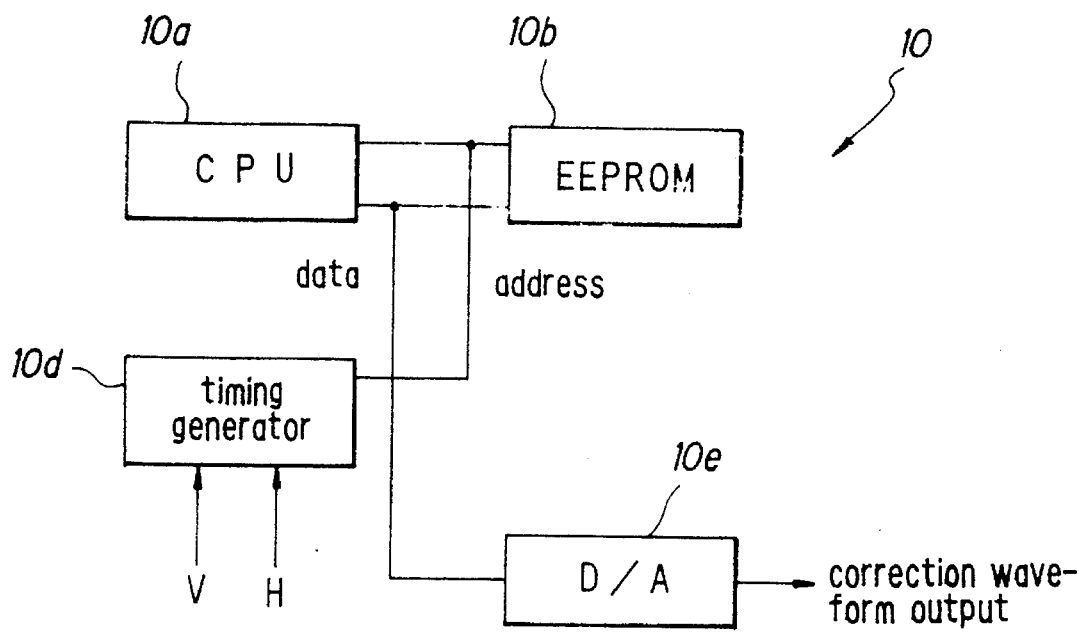
FIG. 10 is a block diagram of a second structure of a registration correction waveform generating circuit.

FIG. 1 is a block diagram of an arrangement of a registration correction waveform generating circuit 10 according to one embodiment of the present invention. Other similar embodiments are shown in FIGS. 8 and 10 and the same reference numerals shown in the related units of FIG. 8 and FIG. 10 are employed as those for indicating the same or similar components, and explanations thereof are omitted. Referring to FIG. 8 first, one arrangement of the above-described registration correction wave generating circuit will be explained, in which a CPU 10a controls various portions of the circuit. The CPU 10a produces registration setting data and interpolates this setting data to calculate the interpolation data. An electrically writable and erasable non-volatile memory (EEPROM) 10b is provided in which the registration setting data output from the CPU 10a is written in response to an address signal supplied from a timing generator 10d. This timing generator 10d generates address signals corresponding to the horizontal sync signal H and the vertical sync signal V.

A static RAM 10C is provided into which the setting data and the interpolation data are written in response to the above-described address signal. That is to say, the CPU 10a performs the high order, more than second order, interpolation calculation relative to the registration setting data read out from the EEPROM 10b, whereby both the calculated interpolation data and the above-described setting data are sequentially written into the static RAM 10c in response to the address signals corresponding to the horizontal sync signal H and the vertical sync signal V. A D/A converter 10e converts the setting data and the interpolation data read out from the static RAM 10c under control of the CPU 10a into the respective registration correction waveform signals to be outputted. It should be noted that the registration correction waveform generating circuit 10 with such an arrangement generates correction waveforms for the red component (R), green component (G), and blue component of the respective primary color pictures, and supplies the correction waveforms to the sub-deflection yokes DY1 arranged for the respective color components.

Figure 9:
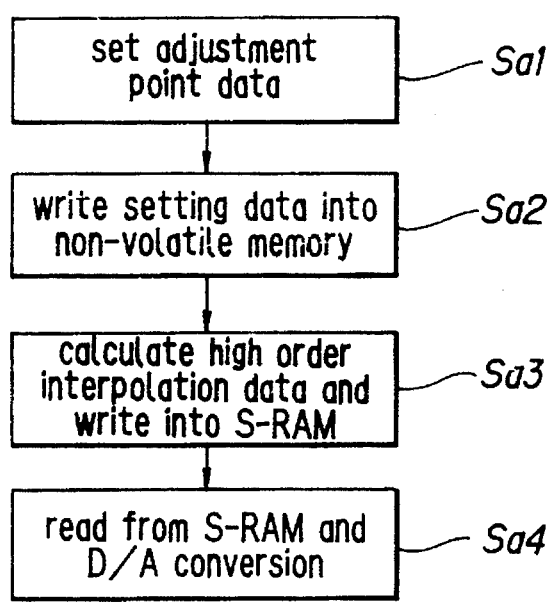
FIG. 9 is a flow chart indicating operation of the registration correction waveform generating circuit of FIG. 8.

The generating circuit 10 with the first arrangement generates the correction waveforms based upon the operations shown in FIG. 9. In other words, when the rear projection television is set to the registration adjusting mode, the process operation by the CPU 10a is advanced to a step Sa1 at which an initial registration adjustment is executed. This initial registration adjustment corresponds to such an adjustment that picture light projected from the respective CRTs onto the screen is displayed with substantially proper conditions. The CPU 10a writes the setting data produced in correspondence with this adjusting operation into the EEPROM 10b.

Subsequently, steps Sa2 to Sa4 represent operation for such a case that the rear projection television displays the normal image after the above-described initial registration adjustment. In this case, when the process operation is first advanced to the step Sa2, the CPU 10a reads the setting data obtained by the above-described initial registration adjustment from the EEPROM 10b, and then the process operation is advanced to the next step Sa3. At the step Sa3, the read setting data are interpolated based on the more than second order function, thereby producing the interpolation data. This interpolation data is produced in such a manner that, as represented in FIG. 12A, for example, the setting data which are indicated by white dots in this figure, are allocated on the horizontal scanning line in each of preselected dot intervals, and the registration correcting amounts corresponding to the respective display dots among these setting data are obtained by way of the interpolation calculation.

Then, the interpolation data obtained by the interpolation calculation are written into the static RAM 10c together with the setting data, and the process operation is advanced to the next step Sa4. When the process of the CPU 10a is advanced to the step Sa4, the setting data and the interpolation data are successively read from the RAM 10c in accordance with the address signals corresponding to the horizontal sync signal H and the vertical sync signal V. These data are supplied to the D/A converter 10e, thereby being converted into analog signals which will then be supplied as the registration correction waveforms to the sub-deflection yokes DY1. As a result, correct pictures from which picture distortion caused by asymmetry of the optical system has been eliminated are projected onto the screen SC.

Now, one example of interpolation data obtained by the above-described interpolation calculation will be explained with reference to FIGS. 12A and 12B.

Figure 12A:
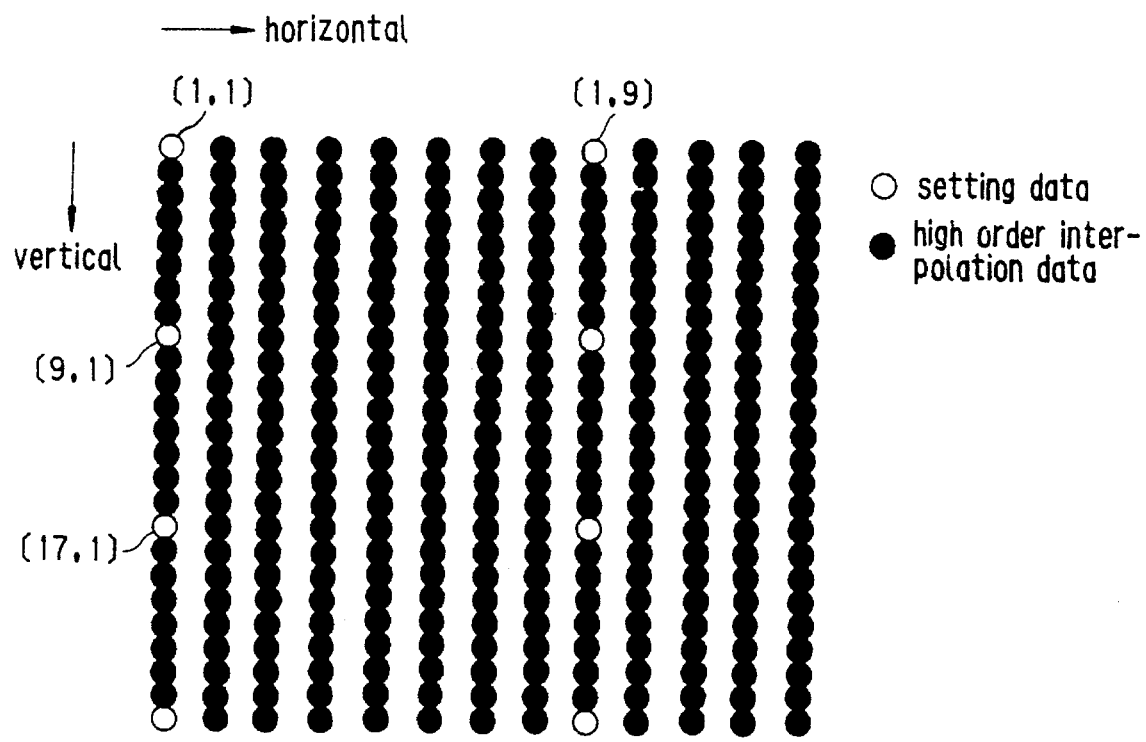
FIGS. 12A and 12B are diagrams useful in explaining the interpolation mode.
Figure 12B:
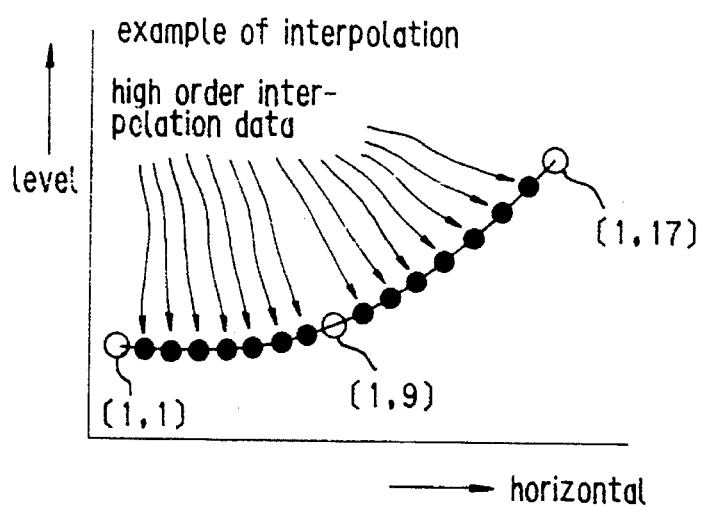

First, FIG. 12A represents the display screen and indicates a relationship between the setting data for forming the display dots and the interpolation data. In FIG. 12A, the white dot corresponds to a display dot to which the setting data has been allocated, and the black dot is a display dot indicative of the interpolation data interpolated in accordance with the white dots.

In this case, the white dots constituting the setting data are set for every 8 dots along both the horizontal and vertical directions, and the interpolation data or interpolation levels are calculated at the black dot positions by the interpolation calculation based on the more than second order function with the employment of at least more than three setting data. For instance, as shown in FIG. 12A, when the display dots (1,1) to (1,9) are interpolated in correspondence to the first horizontal scanning line, as shown in FIG. 12B, the white dots (1,1), (1,9) and (1,17) are employed as the setting data, and the more than second order interpolation calculation is carried out, so that the interpolation levels in the seven black dots among these white dots are successively interpolated.

On the other hand, in the generating circuit 10 with the first structure as shown in FIG. 8, the setting data produced by the initial registration adjustment are written into the EEPROM 10b, the interpolation data obtained from the interpolation calculation during the normal use are written into the RAM 10c together with the setting data, and then picture distortion is corrected in accordance with these data.

Alternatively, as illustrated in FIG. 10, it is possible to constitute such an arrangement that the setting data are obtained during the initial registration adjustment to perform the interpolation calculation, and these setting data are written into the EEPROM 10b together with these obtained interpolation data.

Figure 11:
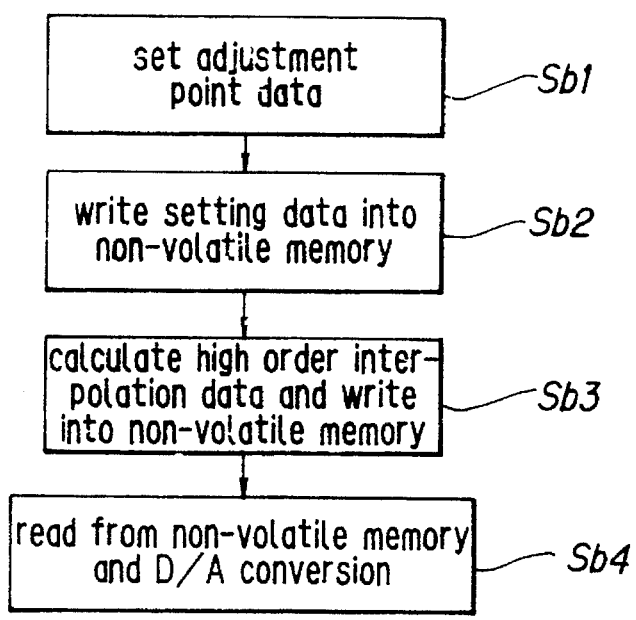
FIG. 11 is a flow chart indicating operation of the registration correction waveform generating circuit of FIG. 10.

In the generating circuit constructed according to the second embodiment and shown in FIG. 10, the correction waveforms are produced based upon an operation shown in FIG. 11. That is to say, when the rear projection television is set to the registration adjustment mode, the process operation of the CPU 10a is advanced to a step Sb1 at which the registration adjustment is performed. In this registration adjustment step, while a user observes the screen, the user manipulates a remote controller or a key switch so that the picture light projected from the respective CRTs onto the screen SC is properly displayed. Next, when the process operation is advanced to a step Sb2, the CPU 10a generates the setting data in response to the above-described adjustment operation, and writes the setting data into the EEPROM 10b. Then, the process operation is advanced to the next step Sb3.

At this step Sb3, based on the setting data obtained by the registration adjustment, the interpolation calculation is carried out in the condition as shown in FIG. 12, thereby producing the interpolation data. Then, the interpolation data obtained by the interpolation calculation are written into the EEPROM 10b. Subsequently, at a step Sb4, the setting data and the interpolation data are sequentially read out from the EEPROM 10b in response to the address signals corresponding to the horizontal sync signal H and the vertical sync signal V. These data are supplied to the D/A converter 10e, thereby producing the registration correction waveforms which will then be supplied to the sub-deflection yokes DY1. As a consequence, the proper pictures from which the picture distortion caused by asymmetry of the optical system has been removed are projected onto the screen SC.

A different point of the embodiment shown in FIG. 1 from the second structure shown in FIG. 10 is that a calculating circuit 10f for performing first order, that is, linear, interpolation by means of hardware is employed. The calculating circuit 10f reads out either the setting data, or the high order interpolation data stored in the EEPROM 10b, and then interpolates data between the read-out setting data and the high order interpolation data by way of the first order interpolation, thereby producing low order interpolation data.

On one hand, in the registration correction waveform generating circuit 10 having the first arrangement of FIG. 8, the respective setting data are produced during the registration adjustment. While these setting data are interpolated with the interpolation data by way of the interpolation calculation during the picture projection, the correction waveforms are produced based upon the interpolation data and the setting data, whereby distortion of this picture is corrected. As a consequence, there are problems in that the load of the CPU 10a becomes large, and a lengthy time period is required to execute the high order interpolation calculation. Also, there are other drawbacks in that the circuit arrangement becomes complex because the setting data and the interpolation data must be read/written from/into the EEPROM 10b and the RAM 10c, resulting in higher product cost.

On the other hand, in the generating circuit 10 with the second structure of FIG. 10, since both the setting data and the interpolation data are generated together during the registration adjustment, delays in the interpolation calculating time required to produce the interpolation data may be negligible. Nevertheless, the non-volatile memory EEPROM 10b having such a large memory capacity is required in order to store the setting data and the interpolation data, corresponding to the number of display dots for a single picture. There is a drawback that higher product cost is induced by employing such a non-volatile memory a large memory capacity.

Figure 2:
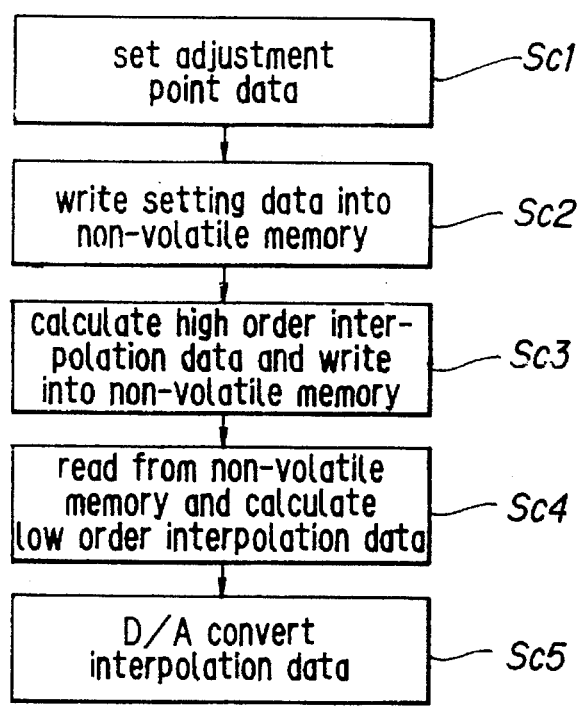
FIG. 2 is a flow chart for showing the operation of the embodiment of FIG. 1.
Figure 3:
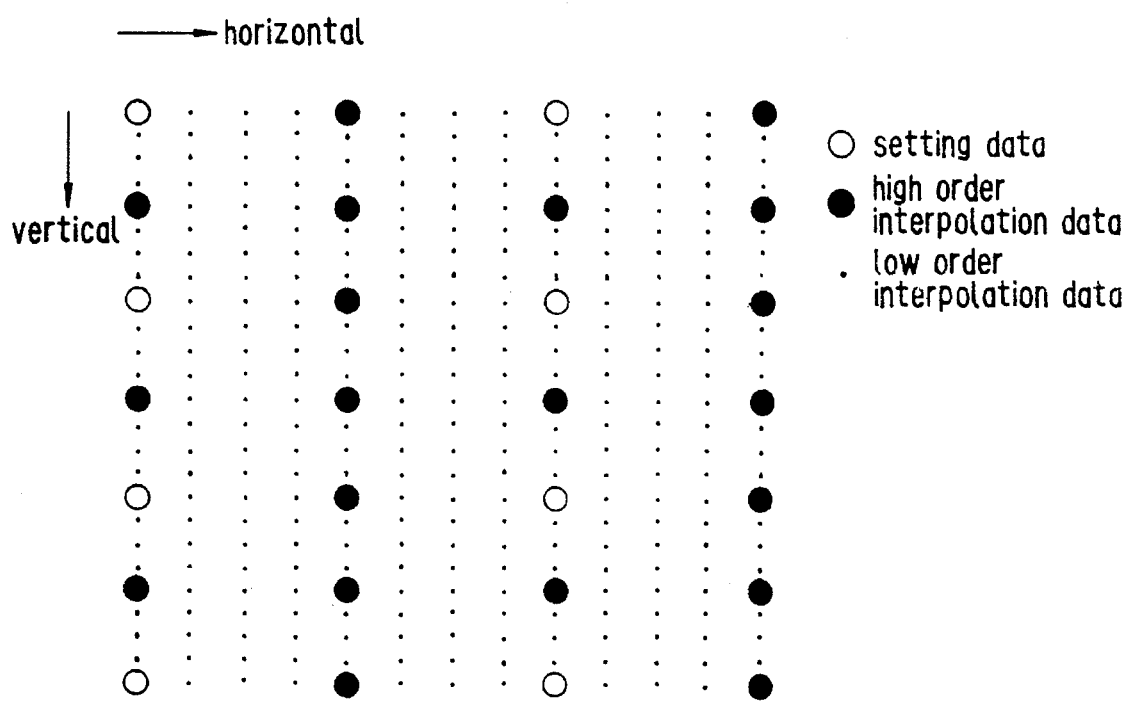
FIG. 3 is a diagram useful in explaining an interpolation mode of the embodiment of FIG. 1.
Figure 4:
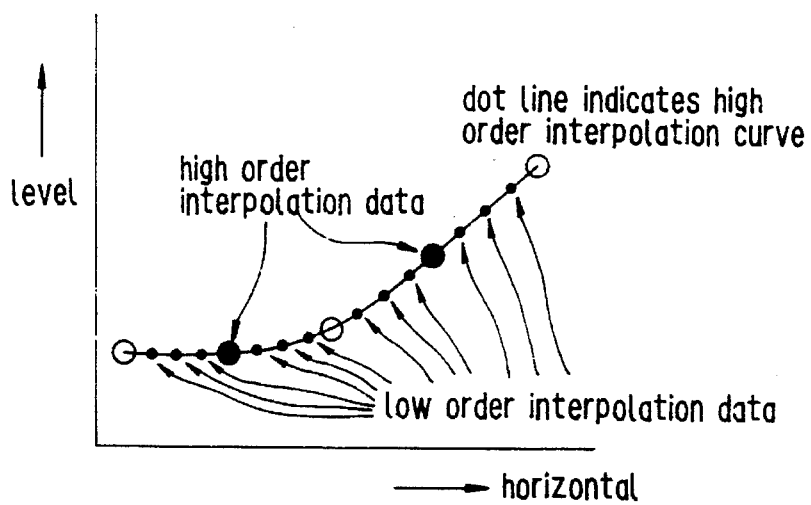
FIG. 4 is a diagram also useful in explaining an interpolation mode of the embodiment of FIG. 1.
Figure 5B:
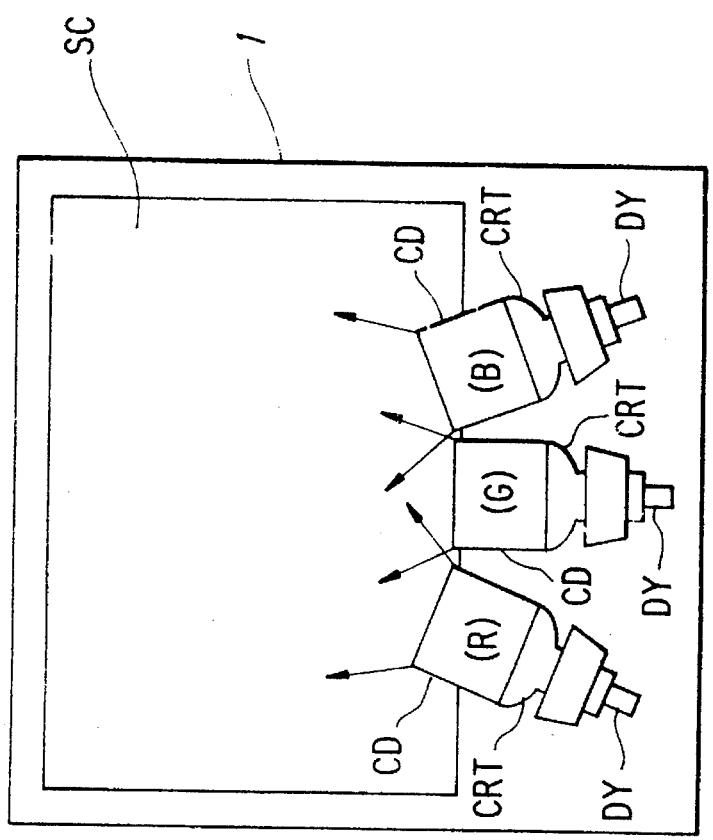
FIGS. 5A and 5B are diagrams useful in explaining the structure of a known rear projection television.
Figure 5A:
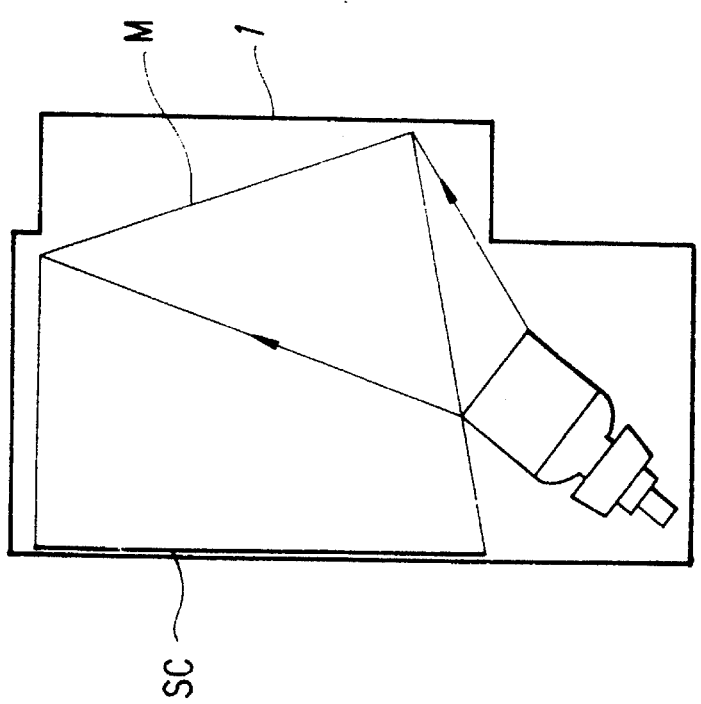
Figure 6:
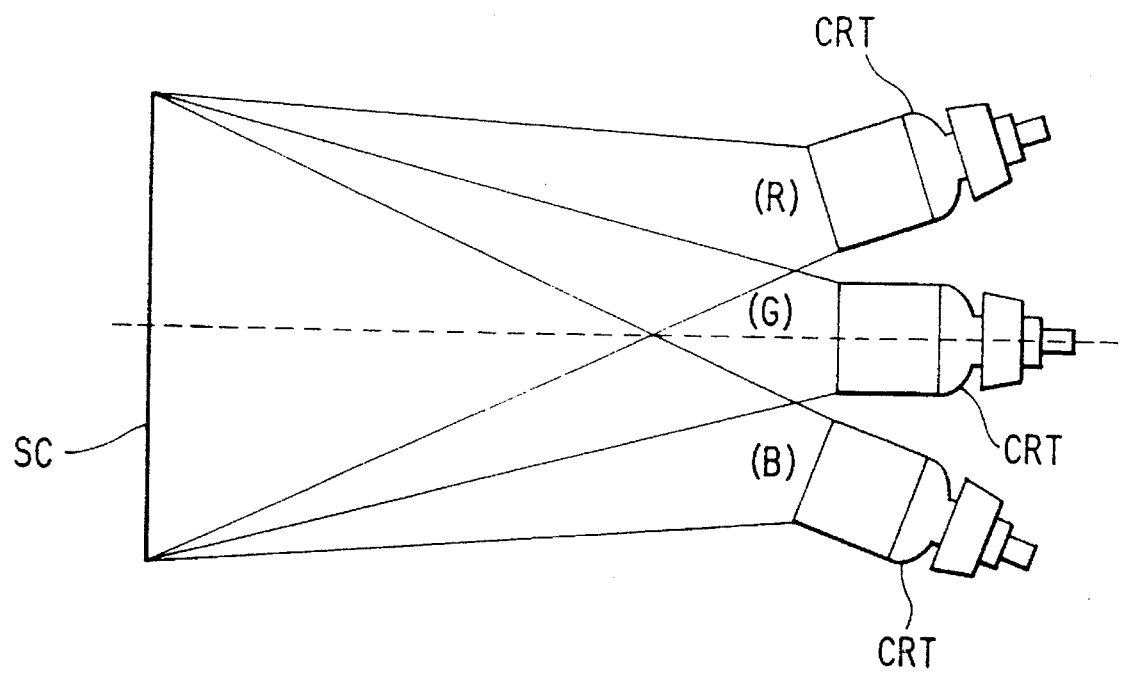
FIG. 6 is a diagram useful in explaining the structure of another known rear projection television.
Figure 7:
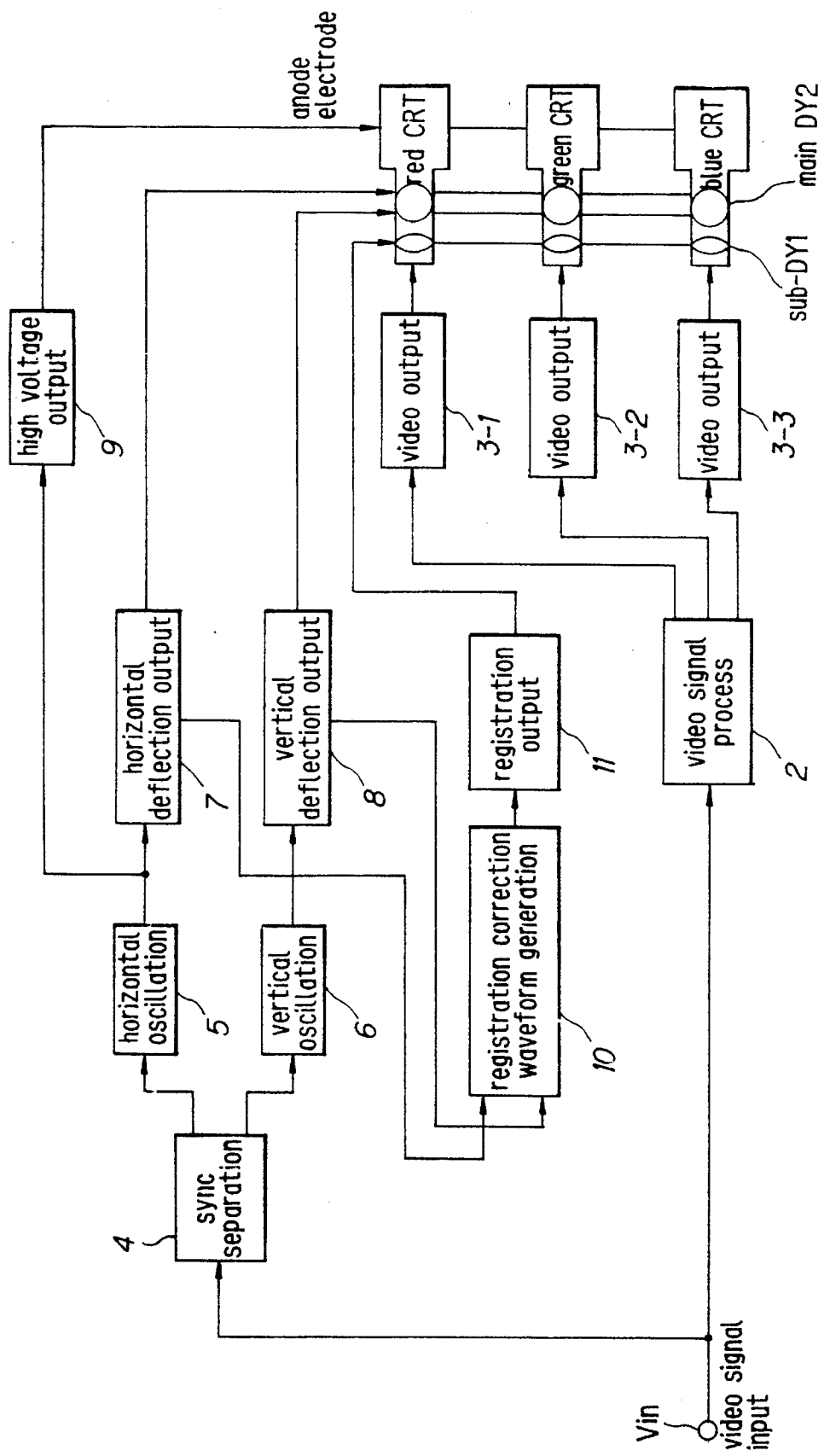
FIG. 7 is a block diagram of an electric structure of a rear projection television having a correction waveform generator.

With reference to FIGS. 2 to 4, an operation of the embodiment equipped with the calculation circuit 10f will now be described. First, when a rear projection television on which this embodiment is mounted is set to the registration adjustment mode, a process operation of a CPU 10a executes a step Sc1 shown in FIG. 2 to perform an initial registration adjustment. The initial registration adjustment implies that, as previously stated, such an adjustment is carried out to substantially properly display picture light projected from the respective CRTs onto the screen SC. For example, while a user observes a screen, either a remote controller or a key switch is operated by the user, whereby the picture light projected from the respective CRTs to the screen SC can be substantially properly displayed thereon.

Subsequently, when the setting data corresponding to such an initial registration adjustment, namely the setting data for properly displaying the picture light is produced, the process operation of the CPU 10a is advanced to a step Sc2. It should be noted, as shown by the white dots of FIG. 3, that this setting data is produced in correspondence with each of the predetermined dot intervals on the respective horizontal scanning line in the display screen. Then, when the process operation is advanced to a step Sc2, the setting data produced in response to the adjustment operation is written into the EEPROM 10b corresponding to the non-volatile memory, and the process operation is advanced to the next step Sc3.

At step Sc3, at least three pieces of setting data are read out from the EEPROM 10b for every horizontal scanning line, and high order interpolation data are produced among these setting data by way of more than second order, that is, high-order interpolation calculations are used to perform the interpolation. It should be understood that as indicated by the black dots of FIG. 3, the high-order interpolation data represents a correction amount of registration at a display dot positioned at a center between the respective setting data indicated by the white dots. As a result, as shown in FIG. 4, the registration correction amounts are obtained based on the setting data, which are the white dots, and the high-order interpolation data, which are the black dots, for every horizontal scanning line. These correction amounts are sequentially written into the EEPROM 10b.

When the high order interpolation data are stored into the EEPROM 10b in the above-described manner, the process operation of the CPU 10a is advanced to steps Sc4 and Sc5. Here, the step subsequent to step Sc4 represents an operation performed when the rear projection television displays a normal picture. At the step Sc4, the above-described calculation circuit 10f produces the low order interpolation data based on the setting data and the high-order interpolation data. In other words, the CPU 10a reads both the setting data and the high order interpolation data from the EEPROM 10b in response to the address signals corresponding to the horizontal sync signal H and the vertical sync signal V, and then supplies the setting data and the high order interpolation data to the calculation circuit 10f. The calculation circuit 10f interpolates the registration correction amounts at the respective amounts at the respective display dots indicated by the black dots in FIG. 3 by linear interpolation of the data between the setting data and the high order interpolation data, as illustrated in FIG. 4.

Next, when the process operation is advanced to step Sc5, the setting data and the high order interpolation data, which are read out from the EEPROM 10b in response to the address signals corresponding to the horizontal sync signal H and the vertical sync signal V and, further, the low order interpolation data calculated in accordance with these data are supplied to the D/A converter 10e and converted into analog signals which will then be supplied as the registration correction waveforms to the sub-deflection yokes DY1. As a result, a proper picture without any picture distortion is displayed on the screen SC.

As previously explained in the above-explained embodiment, the setting data are produced in accordance with the initial registration adjustment operation, and furthermore, one piece of high order interpolation data is interpolated among the setting data by way of the interpolation calculation with at least three pieces of setting data employed for every horizontal scanning line. Then, the registration correction amounts of the respective display dots corresponding to the data among the setting data and the high order interpolation data, may be obtained by means of the linear interpolation by using the setting data and the high-order interpolation data.

As a consequence, differing from the conventional method for calculating all of the interpolation data by means of the high order interpolation calculations, one piece of high order interpolation data is interpolated between the setting data, and then low-order interpolation data is interpolated between this high-order interpolation piece and the setting data. Therefore, the amount of calculations can be substantially lowered. Moreover, according to this embodiment, since the calculating circuit 10f executes the low-order interpolation calculation in the hardware mode, the low-order interpolation can be calculated at a high speed without loading down the CPU 10a. Although the non-volatile memory EEPROM 10b having a large memory capacity for storing the setting data and the interpolation data corresponding to the number of display dots for a single picture is required in one of the approached discussed above, this embodiment requires only ⅕ of the memory capacity of the conventional memory. Thus, such a non-volatile memory with a large memory capacity is not required in the above-explained embodiment.

A description will now be made of such a case that a color image appliance and a registration interpolating method thereof, according to the present invention, are embodied in a rear projection television.

Figure 13:
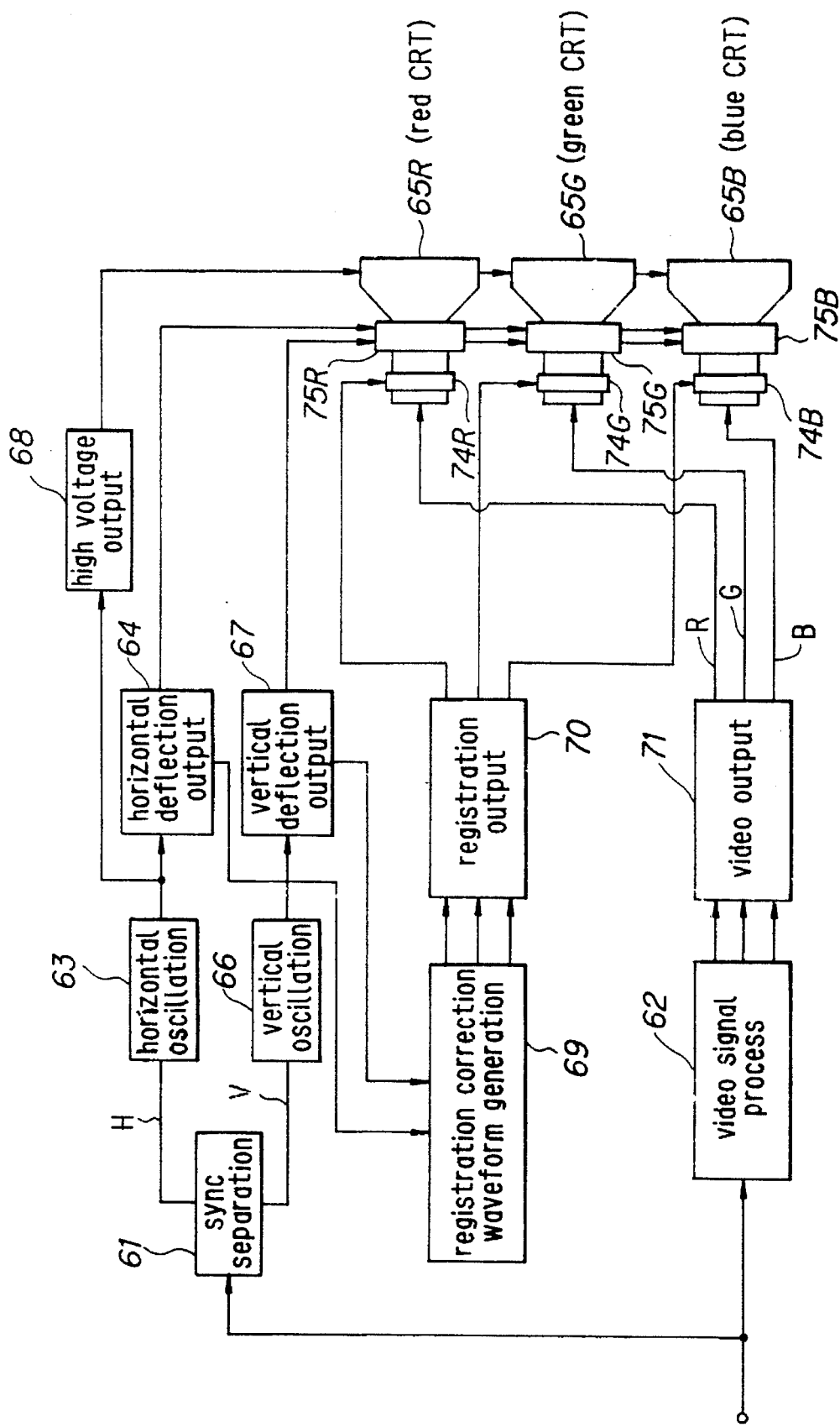
FIG. 13 is a circuit block diagram of a rear projection television according to another embodiment of the present invention.

FIG. 13 is a block diagram of a circuit arrangement of a rear projection television according to an embodiment of the present invention, in which a sync separating circuit 61 separates the horizontal sync signal H and the vertical sync signal V from a video signal input to this sync separating circuit 61. The horizontal sync signal H forms a scanning signal in a horizontal oscillating circuit 63, which will then be supplied via a horizontal deflection output circuit 64 to main deflection coils 75R, 75G, and 75B. Similarly, the vertical sync signal V is supplied via a vertical deflection output circuit 67 to the main deflection coils 75R, 75G, 75B mounted on neck portions of a red CRT 65R, a green CRT 65G, and a blue CRT 65B. The high voltage is applied from the horizontal oscillating circuit 63 via a high voltage output circuit 68 to an anode electrode of each of the CRTs 65R, 65G, and 65B. From the horizontal deflection output circuit 64 and the vertical deflection output circuit 67, data used to produce the correction waveforms corresponding to the interpolation point region of the image are output to a registration correction wave generating unit 69 the details of which will be set forth below. The correction data for the respective colors derived from the registration correction wave generating unit 69 are amplified in a registration output unit 70, and then the respective amplified correction data are supplied to the respective sub deflection coils 74R, 74G, 74B arranged near the main deflection coils 75R, 75G, 75B for the respective CRTs 65R, 65G, 65B.

The video signals processed in the video signal processing circuit 62 with respect to various signal processing operations, are amplified in a video output unit 71 to produce the R, G, B color drive signals, which are supplied to the cathode electrode terminals of the red CRT 65R, the green CRT 65G, and the blue CRT 65B.

Figure 14:
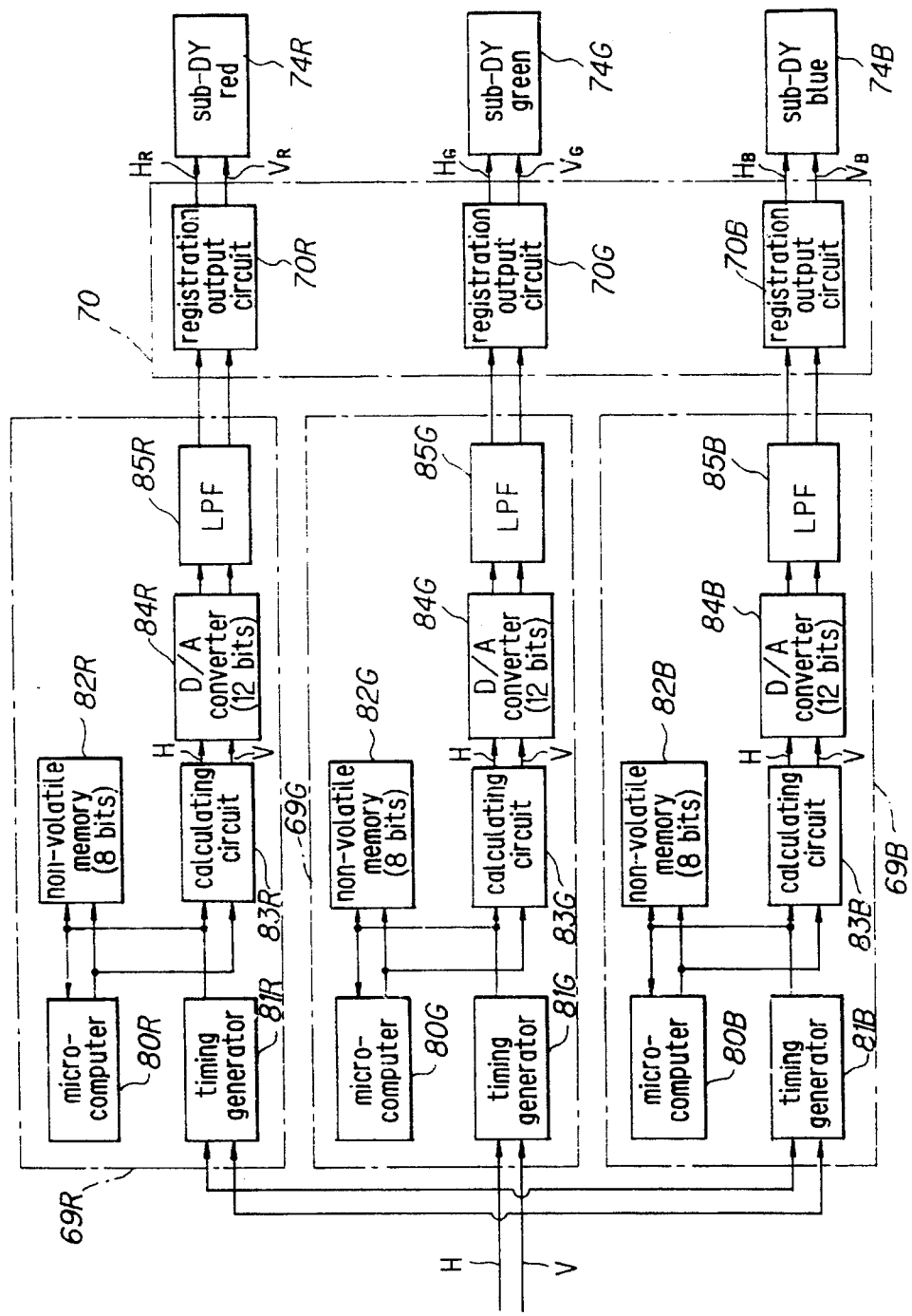
FIG. 14 is a circuit block diagram of a portion of the registration correction waveform generating unit in the system of FIG. 13.

FIG. 14 is a circuit block diagram showing in more detail the registration correction waveform generating unit 69 for the respective primary color signals. As indicated by a dot and dash line, this registration correction waveform generating unit 69 is made up of a red waveform generating unit 69R, a green waveform generating unit 69G, and a blue waveform generating unit 69B. Then, to perform the registration correction, the correction waveform data are calculated with respect to the respective CRTs 65R, 65G, 65B in each of the waveform generating units 69R, 69G, 69B, and the calculated correction waveform data are supplied via the registration output circuits 70R, 70G, 70B to the respective sub-deflection coils 74R, 74G, 74B.

A microcomputer 80R, 80G, 80B is provided for each color signal and operates to set various sorts of data about the setting data for the adjustment points. A timing generator 81R, 81G, 81B for each color generates a control signal at a predetermined timing based on the horizontal and vertical sync signals fed thereto. A non-volatile memory 82R, 82G, 82B for each color signal sets the setting data about the adjustment points with 8-bit resolution. A calculating circuit 83R, 83G, 83B for each of the color signals performs a calculation process in which 4-bit data is added to 8-bit data relating to the adjustment point. Thus, the resolution of the added 8-bit data becomes identical to 12-bit resolution of the respective D/A converters 84R, 84G, 84B provided in the following stage. A low-pass filter 85R, 85G, 85B for each of the three color signals smoothes the respective outputs of the D/A converters 84T, 84G, 84B.

In the above-described circuit, when the registration output for correcting image distortion is supplied to the sub-deflection coils 74R, 74G, 74B, the 8-bit adjustment point is set as initial data into the non-volatile, 8-bit memories 82R, 82G, 82B, respectively. Then, this 8-bit data is read out from the non-volatile memories 82R, 82G, 82B, and then 4-bit data is added to this read-out 8-bit data in the calculating circuits 84R, 84G, 84B in such a way that the resultant data has the same data length as the resolution of the D/A converters 85R, 85G, 85B. Furthermore, an interpolation calculating process is performed based on 12 bits in the calculating circuits 84R, 84G, 84B in order to calculate the interpolation data for the three color signals, and the calculated 12-bit interpolation data is outputted to the respective D/A converters 85r, 85G, 85B.

The 12-bit interpolation data which has been converted from digital to analog in the D/A converters 84R, 84G, 84B is smoothed in the respective low-pass filters 85R, 85G, 85B, and supplied via the respective registration output circuit 70R, 70G, 70B to the respective sub-deflection coil 74R, 74G, 74B.

Figure 15:
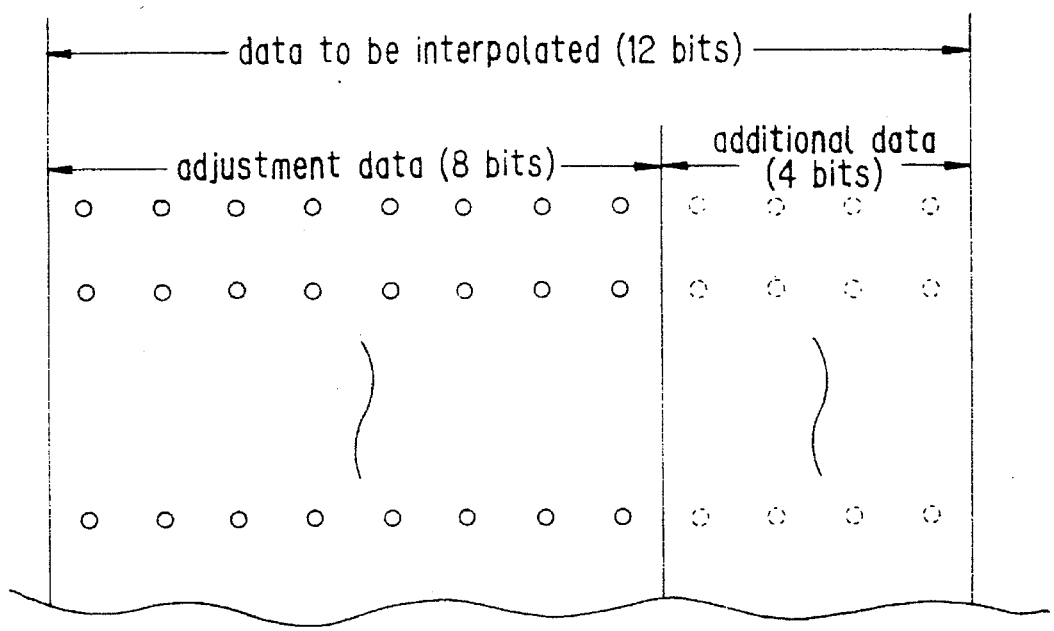
FIG. 15 schematically shows a case in which 4-bit additional data is added to perform the interpolation calculation process.

FIG. 15 schematically shows the situation in which the 4-bit data is added in each of the calculating circuits 84R, 84G, 84B.

As described, the data of the adjustment point is set into the non-volatile memory 82 in 8 bits and when the interpolation calculation process is carried out in the calculation processing unit 84, 4-bit additional data, as shown by dotted line circles in FIG. 15, is first added as data smaller than the LSB of the 8-bit adjustment data read out from the non-volatile memories 82R, 82G, 82B. All of the 4-bit additional data are identical to each other and all have an arbitrary value. The adjustment point data to which the additional data has been added is handled as 12-bit data to be interpolated. The interpolation calculation process is carried out and the resultant interpolated data is outputted to the respective D/A converters 85R, 85G, 85B. Then, the 12-bit interpolation data processed by the interpolation calculation process is digital to analog converted by respective the D/A converters 85R, 85G, 85B.

Figure 16:
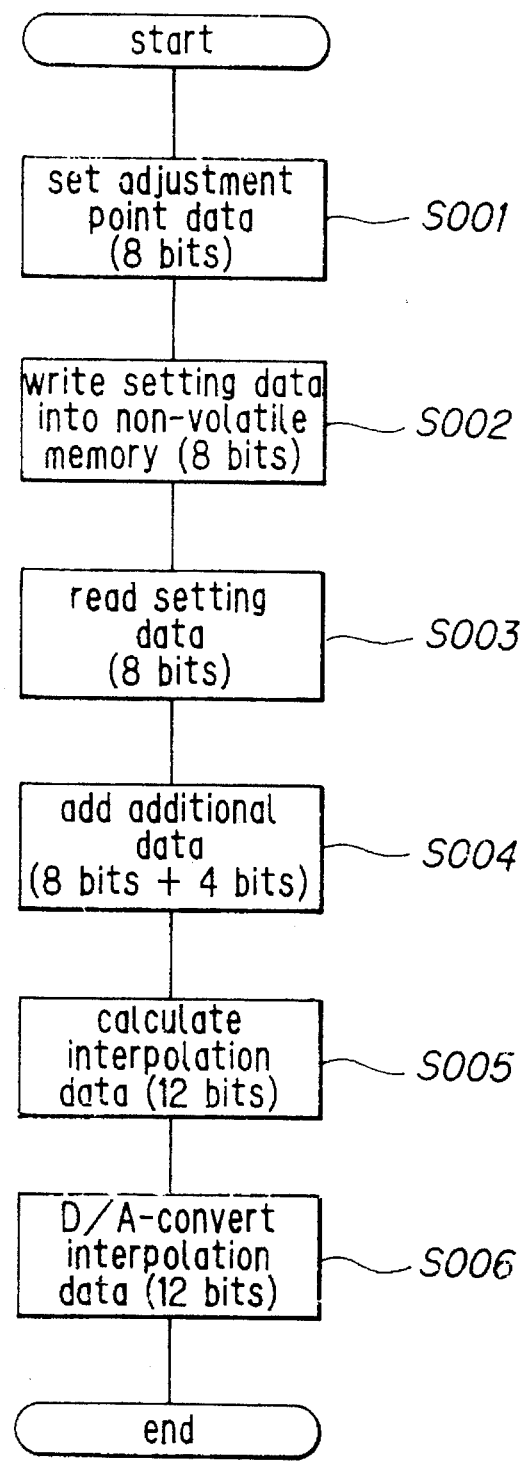
FIG. 16 is a flow chart representing a process operation effected in the registration correction waveform generating unit in the system of FIG. 13.

FIG. 16 is a flow chart representing a processing operation effected in the registration correction waveform generating unit 69 of FIG. 13.

When an image distortion adjustment is carried out, registration correction data obtained from such a measuring device as image distortion and convergence is first set as 8-bit data for every adjustment point in step S001, and the setting data is written into the non-volatile memories 82R, 82G, 82B in step S002. Then, when the correction waveforms to be applied to the sub-deflection coils 74R, 74G, 74B for correcting image distortion are generated, the setting data set at 8 bits into the non-volatile memories 82R, 82G, 82B are read out in step S003. In the calculating circuits 83R, 83G, 83B, 4-bit additional data is added to the 8-bit setting data in step S004. Then, the interpolation calculation process is carried out based on the 12-bit data now available to be interpolated, to which the additional data was added in step S005. The interpolation data calculated at step S005 is digital to analog converted in the D/A converters 85R, 85G, 85B in 12-bit resolution, and the resultant interpolation data is outputted as correction deflection waveform data in step S006.

Figure 17:
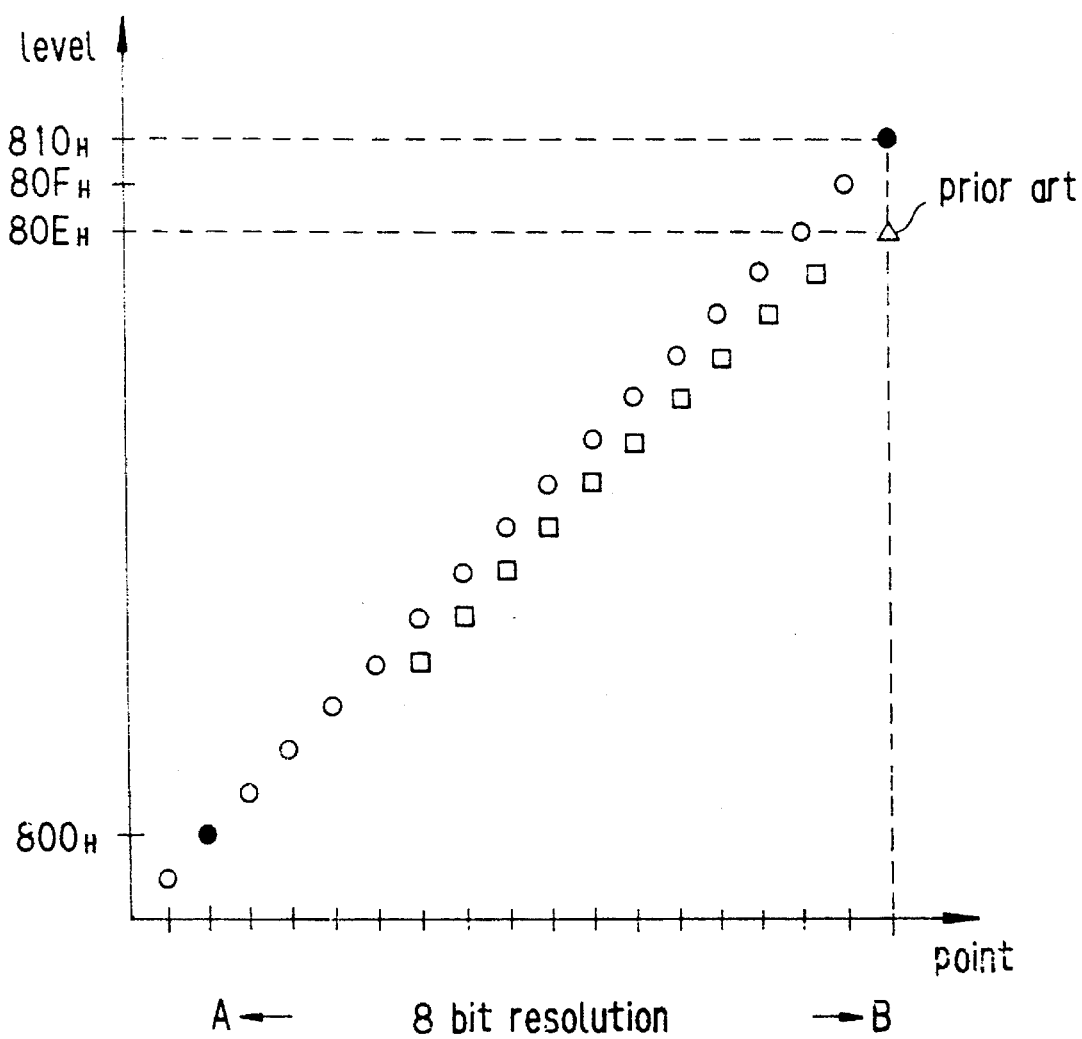
FIG. 17 schematically represents one example of interpolation data calculated by the interpolation calculation process.

FIG. 17 schematically shows one example of interpolation data calculated by the above-described interpolation calculation process. The abscissa indicates an interpolation point, and the ordinate axis represents a level of the interpolation point in hexadecimal notation. The black circle represents 8-bit setting data of adjustment points, and the white circle denotes 12-bit interpolation data of the interpolation points.

As shown in this drawing, for instance, the setting data 800H and 810H at points A and B are interpolated at sixteen interpolation points, which are outputted as 12-bit data. In this case, since the setting data is selected to be 8 bits, interpolation precision thereof is lowered as compared with that of the conventional 12-bit data, as shown by the white triangle, however, since this 8-bit setting data is converted into the 12-bit analog signal after being interpolated, the correction waveform thereof can be smoothed. As previously explained, there is no problem that precision of the lower 4-bit data is within the allowable range with regard to the registration correction.

Figure 18:
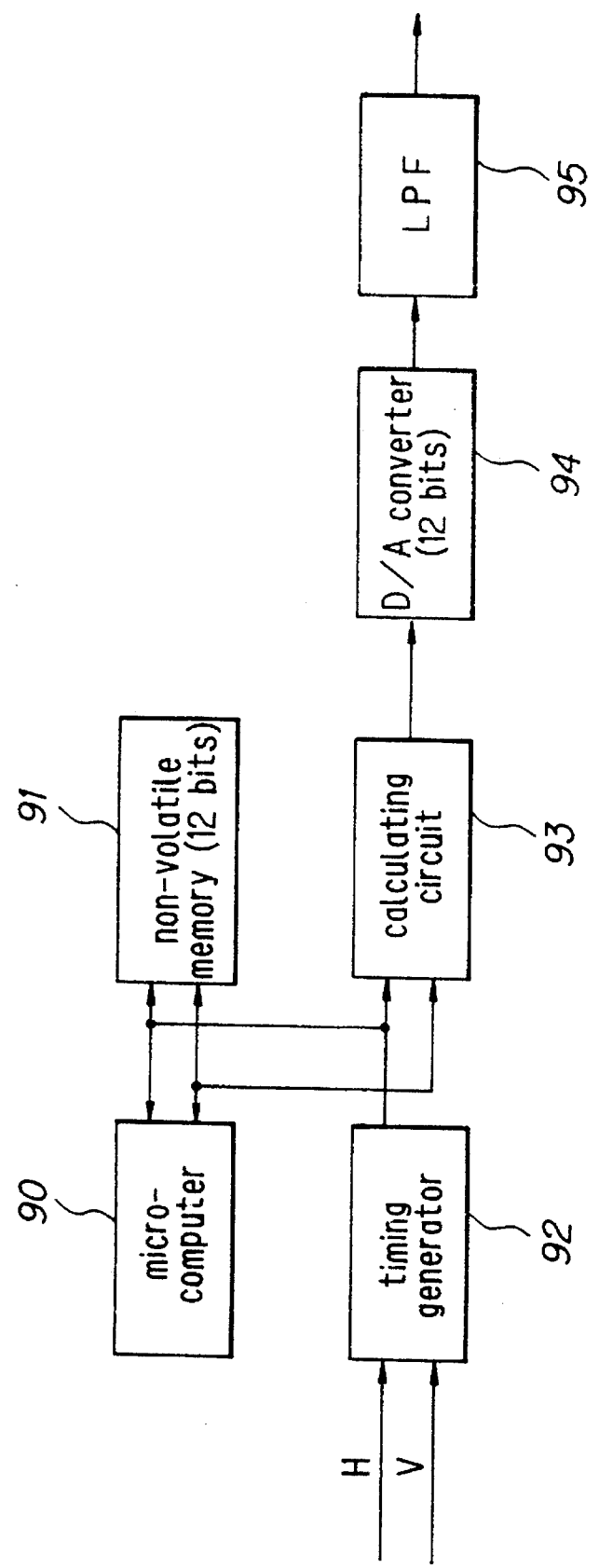
FIG. 18 is a circuit block diagram for constituting the registration correction waveform generating unit shown in FIG. 7.

FIG. 18 is a block diagram an example of a circuit portion of such a registration correction waveform generating unit 69 shown in FIG. 13.

A microcomputer 90 for performs various control operations, such as setting of data about adjustment points and writing into the 12-bit non-volatile memory 91. A timing generator 92 generates a control signal at a predetermined timing based on the horizontal sync signal H and the vertical sync signal V fed thereto. A calculating circuit 43 calculates interpolation data and the like based on the data set into the non-volatile memory 91. A 12-bit D/A converter 94, and a low-pass filter 95 for smoothing the output from the 12-bit D/A converter 94 are provided.

In the above-described circuit, a region of an image is determined by, for example, 8 points in the horizontal direction and 10 points in the vertical direction. The data of these adjustment points is set as 12-bit digital data, and the setting data is written into the on-volatile memory 91. Then, when the correction waveforms to be supplied to the sub deflection coils for correcting distortion are produced, the setting data about the adjustment points which have been set into the non-volatile memory 91, are read out. Based upon the setting data, the calculation process to calculate the interpolation data among the adjustment points is performed in the calculating circuit 93. Then, the calculated interpolation data are amplified and filtered via the low-pass filter 95 by the registration output circuit, and the amplified interpolation data are outputted as the deflection waveform data to the sub DY.

In this case, since the 12-bit D/A converter 94 is utilized, resolution among the adjustment points may also be 12 bits, however, drift of the 12-bit D/A converter 94 becomes ½ LSB, namely approximately 0.025%. This drift is only 1/20 of drift allowed in the above-described registration correction.

It is understood that the foregoing is presented by way of example only and that various modifications may be made without departing from the spirit or scope of the invention, which should be determined solely from the appended claims.

What is claimed is:

1. A projection television apparatus comprising:
   a video signal processing circuit receiving an input video signal for processing a red component signal, a green component signal and a blue component signal of the input video signal;
   three cathode ray tubes for displaying output signals from said video signal processing circuit, respectively;

a registration correction waveform generation circuit for producing correction signals for the three cathode ray tubes using setting data represented as data points on a waveform, including high-order interpolating means for performing a high order interpolating calculation to the setting data allocated to each data point for interpolating first interpolation data calculated by said high-order interpolating means among the respective data points, and low-order interpolating means for interpolating second interpolation data calculated by a low-order interpolating calculation between either said setting data and said first interpolation data or two pieces of said first interpolation data; and converting means for sequentially sampling the setting data corresponding to the respective data points and said first and second interpolation data interpolated among said data points, and converting the sampled data into a registration correction waveform signal.

2. The projection television apparatus according to claim 1, further comprising storage means, wherein said high-order interpolating means causes said setting data corresponding to the respective data points and said first interpolation data interpolated among said data points to be temporarily stored in said storage means.

3. The projection television apparatus according to claim 1, wherein said high order interpolating means and said low order interpolating means each include storage means, respectively, each for temporarily storing the setting data corresponding to the respective data points, and said first and second interpolation data interpolated among said data points.

4. A color television projecting apparatus having three projection tubes, comprising:

a non-volatile memory having a first bit number for each data word stored therein for storing data used to correct registration of overlapped images formed by said three projection tubes;

an interpolation calculating circuit for interpolating the data read out from said non-volatile memory;

a D/A converter having a second bit number for data fed thereto for converting an output of said interpolation calculating circuit into an analog signal; and an output circuit for supplying the output of said D/A converter to a respective deflecting coil in said three projection tubes, wherein said first bit number for data stored into said non-volatile memory is smaller than said second bit number of said D/A converter.

5. The color television projecting apparatus according to claim 4, wherein said first bit number of the registration setting data stored said non-volatile memory is m bits, and said second bit number the of said D/A converter is set to m+n bits.

6. A registration interpolating method for correction registration of a plurality of images on a screen of a projection television monitor having three primary color picture tubes, comprising the steps of:

setting a bit number of registration adjusting data for primary color picture signals fed to said three primary color picture tubes to n;

adding m-bit data to data smaller than LSB of said data having the bit number of n, thereby converting said data into (n+m)-bit data;

performing an interpolation with the value of said (n+m)-bit data;

performing a first outputting step for outputting (n+m)-bit interpolation data;

a converting said interpolation data using a D/A converter into an analog signal; and performing a second outputting step for outputting an analog deflection correction signal to each projection tube.

* * * * *